United States Patent [19]
Nakagawa et al.

[11] Patent Number: 4,814,807
[45] Date of Patent: Mar. 21, 1989

[54] FOCAL-PLANE SHUTTER BASE

[75] Inventors: Tadashi Nakagawa; Ichiro Nemoto; Ko Aosaki; Atsushi Misawa, all of Yotsukaido, Japan

[73] Assignee: Seikosha Co., Ltd., Tokyo, Japan

[21] Appl. No.: 95,309

[22] Filed: Sep. 10, 1987

[30] Foreign Application Priority Data

Sep. 10, 1986 [JP] Japan .............................. 61-138990[U]
Sep. 10, 1986 [JP] Japan .............................. 61-138991[U]

[51] Int. Cl.$^4$ .......................... G03B 19/12; G03B 9/40
[52] U.S. Cl. .................................. 354/246; 354/152; 354/154
[58] Field of Search ................ 354/246, 248, 249, 250, 354/152, 154

[56] References Cited
U.S. PATENT DOCUMENTS

3,999,196 12/1976 Inoue ..................................... 354/154
4,141,634  2/1979 Inoue ..................................... 354/246
4,294,532 10/1981 Nagagawa .......................... 354/246
4,346,974  8/1982 Saito et al. .......................... 354/154

*Primary Examiner*—A. A. Mathews
*Attorney, Agent, or Firm*—Bruce L. Adams; Van C. Wilks

[57] ABSTRACT

A focal-plane shutter base for use in a camera includes a base plate having a shutter opening. Two sets of blades, each of which consists of a plurality of sheets for blocking light, are mounted on the base plate at one side of the shutter opening. The blades are covered by a cover plate connected to the base plate. Driving members for driving the blades are supported on shafts connected to the base plate. The base plate has a shield portion extending along the outer periphery thereof for preventing unwanted light from entering from the sides of the base plate, and a frame portion surrounding the shutter opening for blocking unwanted light from reaching the shutter opening and for structurally reinforcing the base plate. The base plate, shafts, shield portion and frame portion are all integrally molded from plastic.

15 Claims, 2 Drawing Sheets

FOCAL-PLANE SHUTTER BASE

FIELD OF THE INVENTION

The present invention relates to the structure of the base of a focal-plane shutter for use in a camera and, more particularly, to the structure of a focal-plane shutter base having two sets of movable blades each of which consists of a plurality of light-blocking sheets and which are disposed at the side of the opening in the shutter base.

BACKGROUND OF THE INVENTION

A shutter base of this kind has been fabricated by stamping a plate from a metal material, such as brass or an aluminum alloy, and then coupling shafts, spacers, poles, etc. to the plate by caulking. The shafts are used to support driving members and other linkages. These shafts, spacers, poles, etc are typically fabricated by machining.

In recent years, cameras have been manufactured in smaller sizes and lighter weights. Also, reductions in the cost of manufacturing cameras are continually strived for. With these trends, the shape of the body of each camera has been made simpler. Accordingly, it has become impossible to neglect harmful light rays which pass from the sides of the shutter into the shutter opening. This problem has become more acute with the use of more sensitive films. In an attempt to satisfy the foregoing requirements, it has been proposed to make focal-plane shutter bases from plastics. However, plastics have not been put into practical use because they do not provide sufficient mechanical strength.

SUMMARY OF THE INVENTION

In view of the foregoing, it is an object of the present invention to provide a focal-plane shutter base which satisfies the foregoing requirements and which overcomes the aforementioned problems.

Another object of the present invention is to provide a camera shutter base which is reinforced so as to have sufficient mechanical strength and which satisfies the foregoing requirements.

The above objects are achieved by a focal-plane shutter base for use in a camera, the shutter base comprising a base plate provided with a shutter opening, two sets of blades each of which consists of a plurality of sheets for blocking light, the blades being disposed at the side of the shutter opening, a cover plate for covering the blades, and shafts to which members for driving the blades are held. Shield portions are provided for blocking light rays which pass from the sides of the base plate toward the shutter opening, and the shafts and the shield portions are preferably molded from plastic integrally with the base plate. A frame portion is provided either for mounting a mirror box of the camera or for blocking light rays from entering the camera, and the frame portion and the shafts are preferably molded from plastic integrally with the base plate.

DETAILED DESCRIPTION OF THE INVENTION

Figure 1:
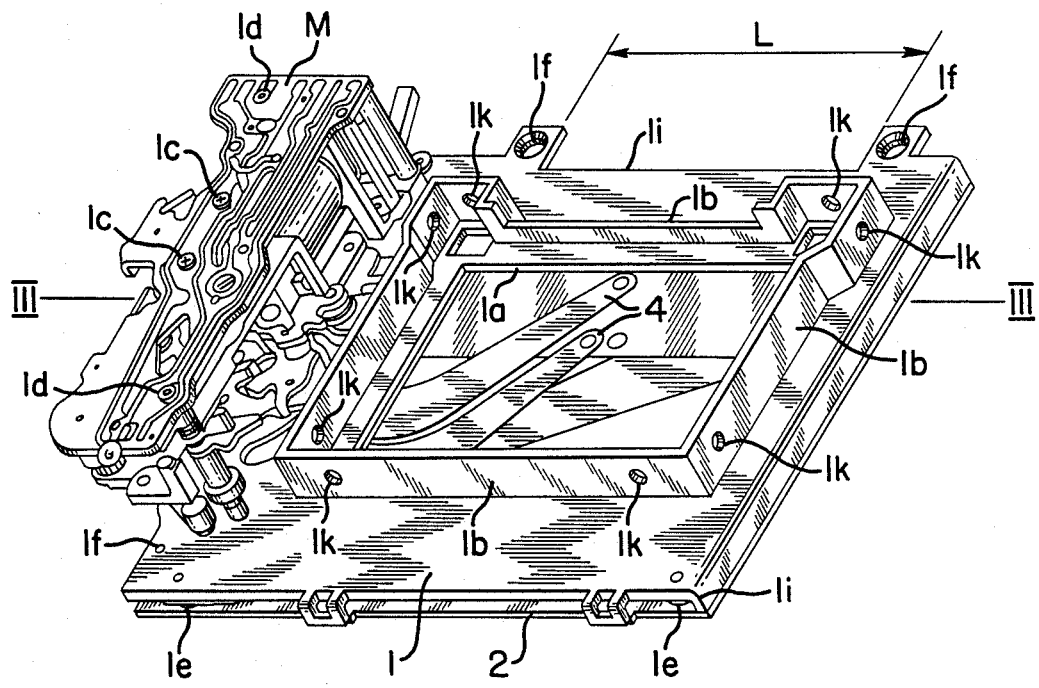
FIG. 1 is a perspective view of a shutter assembly according to the invention.

Referring to FIG. 1, there is shown a shutter base embodying the principles of the invention. The shutter base includes a base plate 1 provided with a shutter opening 1a. A frame 1b, shafts 1c and 1d, poles 1e, and other components are molded as a unit from plastic and positioned around the opening 1a. The frame 1b forms a portion of a mirror box of a single-lens reflex camera, and the remaining portion of the mirror box (not shown) is mounted by means of holes 1k to the frame 1b. Members for driving the blades of a shutter blade control mechanism M are connected to the shafts 1c. Other driving members are connected to the shafts 1d. A cover plate 2 that covers the blades is mounted on the poles 1e. The base plate 1 is provided with holes 1f for mounting a shutter.

Figure 2:
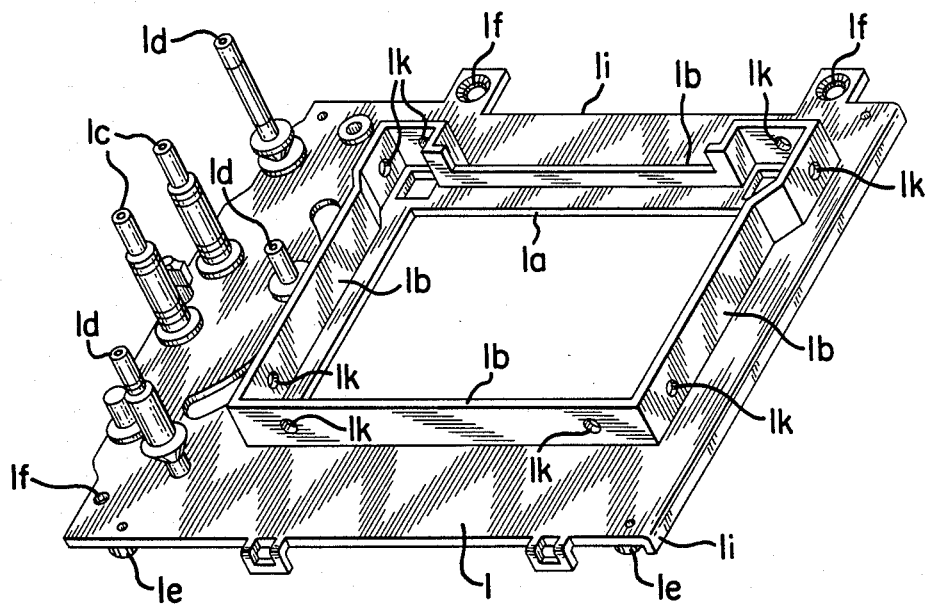
FIG. 2 is a perspective view of the shutter base shown in FIG. 1.

FIG. 2 shows only the base plate 1 which has the shafts 1c and 1d, the poles 1e, the holes 1f, and other components. When the shutter blade control mechanism M, etc. are mounted, the condition shown in FIG. 1 is obtained. The operation of the shutter base is well known and hence is not described in detail herein.

Figure 3:
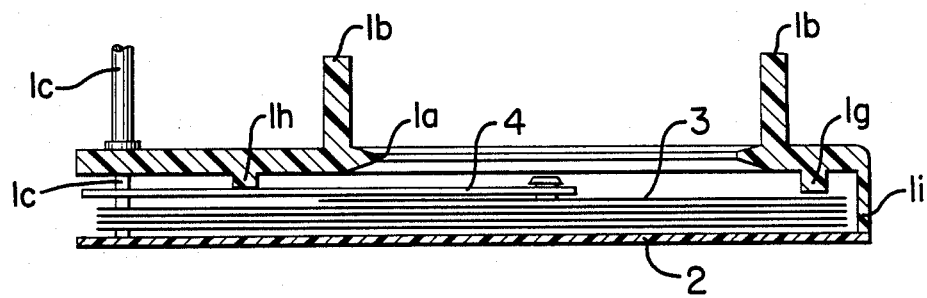
FIG. 3 is a cross-sectional view of main portions of the assembly shown in FIG. 1.

FIG. 3 is a cross-sectional view taken on line III—III of FIG. 1, and in which arms 4 for holding the shutter blades 3 are mounted at the side of the base plate 1. A rodlike protrusion 1g is molded integrally with the base plate 1 to prevent the free distal ends of the blades 3 from vibrating during the operation of the shutter, and to urge the blades against each other while the shutter is not in operation. A rodlike protrusion 1h, whose height is slightly lower than the protrusion 1g, is formed integrally with the base plate 1 and located near the bases of the arms 4. Similar rodlike protrusions 1h are formed at both ends of the two sides (not visible in FIG. 3) other than the sides on which the aforementioned protrusions 1g and 1h are formed.

A thin shield portion 1i is molded integrally with the base plate 1. The shield portion 1i is configured to prevent exterior light from entering through a gap in the camera body and travelling past the shutter into the cover plate 2 thus adversely affecting the film. Similar shield portions 1i are formed between the two holes 1f to block light from entering through the finder (not shown) located at the top of the camera.

In the above example, the frame 1b that forms a portion of the mirror box is molded integrally with the base plate 1. It is also possible to mold the whole mirror box integrally with the base plate. In this case, the holes 1k for the installation of the mirror box are dispensed with. Also, if necessary, the shield portions 1i may be formed along the whole outer periphery of the base plate 1. Where the present invention is applied to a rangefinder camera or the like having no mirror box, the frame 1b forms a light-blocking frame to block exterior light from entering the camera.

As can be understood from the description made thus far, the shield portions 1i for blocking light rays entering from the sides of the base plate 1 are molded integrally with the base plate 1 and also with the shafts 1c and 1d which hold the driving members. This novel shutter base is much more economical to fabricate than the prior art shutter base which has support shafts coupled by caulking and to which separate machined sheets are mounted.

Also, the frame 1b that forms either a part of the mirror box or a light-blocking frame is molded integrally with the base plate 1. Those portions of the frame 1b which extend vertically upwardly from the plane of the flat base plate 1 act as reinforcing beams which structurally reinforce and strengthen the shutter base. Therefore, a sufficient mechanical strength can be achieved without requiring any additional space. Further, the cost of machining shafts and the cost of fastening various components can be reduced, because the shafts and other parts are molded integrally with the base plate. Consequently, a shutter which is small in size, lightweight, and economical to fabricate can be provided.

Moreover, the rodlike protrusions 1g and 1h are molded integrally with the base plate 1 and are located in the gap between the blades and the region in which the arms are moved. Therefore, while the blades are being driven, their vibration is effectively prevented. Further, while the blades are at rest, the gaps between the neighboring blades are narrowed, thus preventing leakage of light. In addition, the base plate 1 is effectively reinforced by the frame 1b and so the base plate can be made from plastic.

We claim:

1. A focal-plane shutter base for a camera, comprising: a base plate having a shutter openings; at least one set of shutter blades mounted on the base plate and driveable to open and closed positions for opening and closing the shutter opening; a cover plate connected to the base plate for covering the shutter blades; a set of shafts connected to and projecting outwardly from the base plate; driving means supported by the shafts for driving the shutter blades to the open and closed positions; and shielding means for preventing unwanted light from entering from the sides of the base plate in the region between the cover plate and the base plate, the shielding means and the shafts being molded from plastic integrally with the base plate.

2. A focal-plane shutter base according to claim 1; wherein the shielding means extends along the outer periphery of the base plate.

3. A focal-plane shutter base according to claim 2; wherein the shielding means extends around the whole outer periphery of the base plate.

4. A focal-plane shutter base according to claim 1; further including a frame surrounding the shutter opening and connected to and projecting outwardly from the base plate, the frame being molded from plastic integrally with the base plate.

5. A focal-plane shutter base according to claim 4; wherein the base plate, shafts, shielding means and frame comprise a one-piece molded plastic structure.

6. A focal-plane shutter base according to claim 4; wherein the frame comprises part of a mirror box of the camera.

7. A focal-plane shutter base according to claim 4; wherein the frame defines means for blocking unwanted light from reaching the shutter opening.

8. A focal-plane shutter base according to claim 4; wherein the frame defines means for structurally reinforcing and strengthening the plastic base plate.

9. A focal-plane shutter base for a camera, comprising: a base plate having a shutter opening; at least one set of shutter blades mounted on the base plate and driveable to open and closed positions for opening and closing the shutter opening; a cover plate connected to the base plate for covering the shutter blades; a set of shafts connected to and projecting outwardly from the base plate; driving means supported by the shafts for driving the shutter blades to the open and closed positions; and a frame surrounding the shutter opening and connected to and projecting outwardly from the base plate, the frame being molded from plastic integrally with the base plate.

10. A focal-plane shutter base according to claim 9; wherein the frame comprises part of a mirror box of the camera.

11. A focal-plane shutter base according to claim 9; wherein the frame defines means for blocking unwanted light from reaching the shutter opening.

12. A focal-plane shutter base according to claim 9; wherein the frame defines means for structurally reinforcing and strengthening the plastic base plate.

13. A focal-plane shutter base according to claim 9; further including shielding means for preventing unwanted light from entering from the sides of the base plate in the region between the cover plate and the base plate, the shielding means being molded from plastic integrally with the base plate.

14. A focal-plane shutter base according to claim 13; wherein the shielding means extends along the outer periphery of the base plate.

15. A focal-plane shutter base according to claim 14; wherein the shielding means extends around the whole outer periphery of the base plate.

* * * * *